(12) United States Patent
Sanchez

(10) Patent No.: US 11,707,413 B2
(45) Date of Patent: Jul. 25, 2023

(54) STORAGE/CONTAINEMENT UNIT FOR FLEXIBLE POUCH FILLED WITH BIOPHARMACEUTICAL FLUID, AND METHOD OF ASSEMBLING A FREEZE/THAW CONTAINMENT SYSTEM, USING A PROTECTING BODY OF CONTROLLED DEFORMATION

(71) Applicant: Sartorius Stedim North America Inc., Bohemia, NY (US)

(72) Inventor: Marc Sanchez, Brooklyn, NY (US)

(73) Assignee: SARTORIUS STEDIM NORTH AMERICA INC, Bohemia, NY (US)

( * ) Notice: Subject to any disclaimer, the term of this patent is extended or adjusted under 35 U.S.C. 154(b) by 837 days.

(21) Appl. No.: 16/686,554

(22) Filed: Nov. 18, 2019

(65) Prior Publication Data
US 2021/0145695 A1 May 20, 2021

(51) Int. Cl.
| | |
|---|---|
| *A01N 1/02* | (2006.01) |
| *A61J 1/16* | (2023.01) |
| *A61J 1/10* | (2006.01) |
| *A61J 1/14* | (2023.01) |
| *B65D 77/06* | (2006.01) |

(52) U.S. Cl.
CPC .............. *A61J 1/16* (2013.01); *A01N 1/0263* (2013.01); *A61J 1/10* (2013.01); *A61J 1/1475* (2013.01); *B65D 77/06* (2013.01)

(58) Field of Classification Search
CPC ................................ A01N 1/0263; A61J 1/16
See application file for complete search history.

(56) References Cited

U.S. PATENT DOCUMENTS

| | | | | |
|---|---|---|---|---|
| 5,295,964 | A  * | 3/1994 | Gauthier | A61J 1/16 604/113 |
| 6,517,526 | B1 * | 2/2003 | Tamari | A61L 2/26 604/408 |
| 8,733,912 | B2 * | 5/2014 | Kimura | B41J 2/17513 347/85 |
| 9,133,431 | B2 * | 9/2015 | Peterson | C12M 45/03 |
| 9,161,527 | B2 * | 10/2015 | Cutting | A01N 1/02 |

(Continued)

FOREIGN PATENT DOCUMENTS

| | | |
|---|---|---|
| EP | 2322442 A1 | 5/2011 |
| WO | 2015200218 A1 | 12/2015 |

*Primary Examiner* — Jonathan M Hurst
(74) *Attorney, Agent, or Firm* — Nixon & Vanderhye

(57) ABSTRACT

A flexible pouch is placed in a stack provided with two plates forming a protecting body to sandwich and constrain the flexible pouch. At opposite margin portions, the protecting body has slots cooperating with positioning members of an outer shell device belonging to the stack. Between the shell parts, the plates can move during filling of the pouch and the margin portions shrink inwardly in a protecting body plane. Some of the positioning members act as stoppers, in order to have lower clearance range for shrink strokes of the protecting body in a middle part thereof, as compared to a higher clearance range at respective longitudinal end parts of the two opposite margin portions. A higher constraining effect can be obtained in a center of the pouch, to limit maximum thickness of its content, which is of interest for managing freeze/thaw operations of biopharmaceutical materials contained in the pouch.

19 Claims, 8 Drawing Sheets

(56) References Cited

U.S. PATENT DOCUMENTS

| | | | | |
|---|---|---|---|---|
| D825,074 S * | 8/2018 | Kitajima | | D24/224 |
| 10,499,458 B2 * | 12/2019 | Shavit | | A61J 1/16 |
| 11,377,276 B2 * | 7/2022 | Mueller | | F26B 5/06 |
| 11,571,359 B2 * | 2/2023 | Sanchez | | A61J 1/10 |
| 2004/0134203 A1 * | 7/2004 | Voute | | A23L 3/364 |
| | | | | 62/66 |
| 2004/0254560 A1 * | 12/2004 | Coelho | | B29C 65/18 |
| | | | | 425/383 |
| 2005/0011202 A1 * | 1/2005 | Voute | | F25D 31/001 |
| | | | | 62/62 |
| 2005/0183976 A1 * | 8/2005 | Brothers | | A61B 10/0096 |
| | | | | 206/438 |
| 2007/0240432 A1 * | 10/2007 | Voute | | A61J 1/165 |
| | | | | 62/66 |
| 2013/0341354 A1 * | 12/2013 | Archer | | B65D 83/0055 |
| | | | | 222/105 |
| 2015/0374583 A1 * | 12/2015 | Pavlik | | B65D 31/06 |
| | | | | 62/66 |
| 2018/0125757 A1 | 5/2018 | Sanchez et al. | | |
| 2018/0128707 A1 * | 5/2018 | Sanchez | | G01M 3/3272 |
| 2019/0336706 A1 * | 11/2019 | Shavit | | A01N 1/0263 |
| 2020/0107993 A1 * | 4/2020 | Cutting | | F25D 17/06 |

\* cited by examiner

STORAGE/CONTAINEMENT UNIT FOR FLEXIBLE POUCH FILLED WITH BIOPHARMACEUTICAL FLUID, AND METHOD OF ASSEMBLING A FREEZE/THAW CONTAINMENT SYSTEM, USING A PROTECTING BODY OF CONTROLLED DEFORMATION

BACKGROUND OF THE INVENTION

Field of the Invention

The present invention generally relates to the protection of a flexible pouch specially designed to contain a biopharmaceutical fluid and more broadly to a system for containing a biopharmaceutical fluid. The invention also relates to methods for manufacturing/assembling such a system that is adapted for freezing and thawing the biopharmaceutical fluid within the system. A biopharmaceutical fluid means a biotechnological derived fluid, for example a fluid derived from a culture medium, a cell culture, a buffer solution, an artificial nutrition liquid, a blood fraction, a blood derived component or a pharmaceutical fluid or, more broadly, a fluid specifically designed to be used in the medical field. Of course, the fluid may become solid or partly solid after freezing (typically at a temperature much lower than 0° C.).

Description of Related Art

It is known to use a flexible pouch to contain biopharmaceutical fluid. The flexible pouch is able to withstand low mechanical stress without damage. Hence, the leakage risk is reduced. Moreover, the flexible pouch is advantageous since it can be folded or stored flat when there is no biopharmaceutical fluid inside. Hence, the flexible pouch occupies a small volume.

The flexible pouch is generally designed for a single use and to contain a biopharmaceutical fluid volume which is between 1 liter and 500 liters.

However, specifically for shipping of the flexible pouch filled with fluid, for example, between several plant areas or from the provider of the fluid to its client which will use it, but also for storage, the flexible pouch must be protected, although the leakage risk is small.

The document EP-2 322 442 discloses a container for a flexible pouch. The container comprises a lower part and an upper part which are rigid and joined along a common edge and which form a single piece container. The container has a volume which is much more important than the volume of the flexible pouch. Indeed, the container comprises positioning means for the flexible pouch which is in interior walls of upper and lower parts. This positioning means define a volume for the flexible pouch which is lower than the total volume of the container.

Consequently, the container has a useless volume. Moreover, if the flexible pouch is not retained by the positioning means, it could be moved within the container, especially during shipping. Thus, the leakage risk increases.

Single-use polymeric containers, hereafter called bags or pouches, are successfully used for the storage of biopharmaceuticals in liquid state. Today, bags made of ethylene vinyl acetate (EVA) or low-density polyethylene (LDPE) have been found suitable for the storage and shipping of biological bulks at ambient or cold temperature (2 to 8° C.). However, problems exist in freezing applications with bags as currently configured. At low temperatures, the physical properties of plastic materials may change sufficiently to introduce brittleness that can reduce the capacity of the bag to absorb external forces, i.e., shocks without fracturing. In addition, ice volumetric expansion can cause significant mechanical stress leading to bag, port, tubing, or connector breakage. It is well known that current commercially available unprotected bags do not adequately protect frozen products.

To eliminate problems related to bag breakage, Sartorius Stedim Biotech has developed the Celsius™ FFT concept (FFT for "Flexible Freeze and Thaw"), which combines a flexible pouch with a semi-rigid protective shell. The contribution of the protective shell is predominant in the absorption of stresses resulting from processing or handling conditions.

Document US 2018/125757 provides a protecting body, so that the flexible pouch is sandwiched by the two plates of the protecting body, with a constraining effect. A freeze/thaw protection system may be obtained, by combining a single-use flexible container wrapped by such a protecting body and a protective shell. However, uniform fluid distribution may be difficult because, in a filled state of the flexible container, a significant bulge (big belly) in the middle is formed. In frozen state, ice expansion is thus relatively significant and more time will be needed to freeze this big mass in the middle of the interior volume of the pouch.

Document WO 2015/200218 discloses a combination of single-use container (flexible container) and shell, in which a tufting coupling is provided, in order to divide the cavity of the container into a plurality of regions. This is of interest to limit risk of having a significant bulge, so that liquid mass concentration is prevented in a middle part of the flexible container. Such design cannot be widely used, especially because the container design is more complex, which increases the cost of the single-use container.

SUMMARY OF THE INVENTION

The purpose of the present invention is to provide a storage unit for obtaining a robust freeze/thaw containment and protection system efficient for limiting liquid mass concentration in middle area of a flexible pouch (typically a 2D-pouch than inflates in a filled state), while keeping flexibility of design for the flexible pouch.

To this end, embodiments of the present invention provide a storage unit for use in freezing, storing and thawing biopharmaceutical materials contained in a flexible pouch, the storage unit comprising:
  a protecting body for protecting the flexible pouch, which comprises two plates, the protecting body further comprising a longitudinal axis and two margin portions at two longitudinal sides of the protecting body;
  a holding and retaining device, the holding and retaining device including positioning members that are engaged in the two opposite margin portions; wherein the two plates comprise each:
  a covering portion for covering the flexible pouch, the covering portion separating the two opposite margin portions;
wherein the two plates are able to sandwich the flexible pouch for constraining the flexible pouch, the protecting body extending planar in an empty state of the flexible pouch, along a protecting body plane;
wherein the protecting body is typically displaceable in an interspace delimited by two separate protecting parts of the holding and retaining device, to allow the two plates moving, extending, and shrinking in a transverse direction belonging to the protecting body plane (the shrinking occurring when filling the pouch),
and wherein all or part of the positioning members is forming stoppers, in order to have lower clearance range for shrink strokes of the protecting body in a middle part thereof, as compared to a higher clearance range at respective longitudinal end parts of the two opposite margin portions.

Typically, the stoppers act for locally stopping inward movement of the two margins portions, which is due to filling of the flexible pouch sandwiched between the two plates of the protecting body.

In some embodiments, the positioning members are distributed longitudinally and are each configured to limit shrink stroke of the longitudinal sides of the protecting body by a stopping effect due to engagement of the positioning members with the two opposite margin portions:
  at one or more intermediate parts, and
  at respective longitudinal end parts of the two opposite margin portions,
a lower clearance range being provided for the engagement of the positioning members at the one or more intermediate parts, so that a shrink stroke of the two longitudinal sides of the protecting body, due to filling of the flexible pouch sandwiched between the two plates of the protecting body, is less limited at the respective end parts than at the one or more intermediate parts.

With such arrangement, easier freezing step is obtained without necessarily modifying design of the pouch, which increases confidence in using a known design on the one hand, and which increase confidence when handling the frozen pouch (well protected by the protecting body and the shell or similar holding and retaining device).

More generally, it is understood that plate circumference can vary with adjusted reduction (shrink stroke) that is different, depending on longitudinal positions of some positioning members that prevent or limit such dimension decrease, for a control of the shrink stroke. Advantageously, no high or higher stroke is allowed as far a middle portion of the covering portion is concerned. In contrast, specific positioning members arranged at intermediate longitudinal positions act to prevent the protecting body longitudinal sides to be moved inwardly as far as portions near the corners or front/rear ends of the protecting body.

Association of the holding and retaining device and the protecting body is of interest to control expansion at the time of filing the pouch, and also to control additional pouch expansion due to the freezing process. Since the protecting body directly constrains the pouch, the constraining effect can be advantageously modulated via heterogeneous distribution of the positioning members, so that adjusted constraining effect are provided and prevent accumulating too much liquid in a middle region of the pouch.

Typically, the protecting body is mounted to cover the two main opposite faces of the flexible pouch, and acts as an expansion guiding element adapted to deploy in volume in an expanded state, so that the assembly composed of the protecting body and the flexible pouch covered by the protecting body can fill an inner cavity delimited by the two protecting parts without bulging more in a covering part middle portion provided at equal distance from front and rear edges of the flexible pouch and separating two other complementary parts of same longitudinal size as a determined longitudinal size of the middle portion (the determined size thus being substantially equal to one third of the longitudinal size of the flexible pouch as the covering portion has same length as the flexible pouch).

The protecting body may comprise and an attachment device for fixing the two plates to each other.

In some options, the two opposite margin portions are part of a fastening assembly to prevent any shifting in position between the two plates once they are mutually fastened at least in the two margin portions, in a predetermined superimposed configuration for forming the protecting body. More generally, the protecting body may be provided with an attachment device for fixing the two plates to each other. In some variants, such attachment device may be provided outside the plates.

Height of the flexible pouch typically cannot exceed 20% of any other dimension of the pouch, due to the containment effect by the protecting body and belt effect in a middle area of the protecting body with restriction of shrink stroke. More generally, the shrink limitation at the middle will limit the belly/bulge to grow at the center of the pouch as if a belt was fastening the container in the middle. Under this constraint, the liquid stored will be spread to the short sides or front/rear sides.

Preferably, the two plates may be considered as extending generally parallel to the protecting body plane, even at the maximum filling state of the pouch sandwiched by the plates, due to the containment effect and 2D-design of the flexible pouch.

Optionally, several protecting body through-slots are provided and longitudinally distributed in each of the two opposite margin portions.

The attachment device may interact with some of the protecting body through-slots or may be distributed in alternate locations relative to the protecting body through-slots.

In various embodiments of the unit of the invention, recourse may optionally also be had to one or more of the following dispositions:
  the protecting body is directly engaged by the positioning members to have a profile of shrink at the protecting body circumference, with almost no reduction or less shrink due to direct engagements of the positioning members engaged in a middle region of the protecting body, at the margin portions.
  the two protecting parts consist in two pieces.
  the two protecting parts are a first frame that typically extends below the protecting body and a second frame that typically extends above the protecting body.
  one amongst the first frame and the second frame comprises a plurality of inserting pins/insertion elements than are inserted via the protecting body through-slots to come in direct contact with receiving adjustment members of the other one amongst the first frame and the second frame.
  the two pieces are complementary halves of an annular plastic shell that is rigid or semi rigid.
  the plastic shell bears or integrally includes the positioning members.
  all or part of the positioning members may be integral parts of the shell.
  the two pieces are configured to sandwich the two margin portions.
  the two pieced are either two pieces that are each configured to entirely cover a corresponding covering portion of the protecting body, or two pieces of same annular shape (configured to sandwich the two margin portions).

the respective end parts include four end parts crossed by four positioning members of the positioning members.

the one or more intermediate parts comprise two intermediate parts constrained by a pair of additional positioning members.

each of the two intermediate parts is intersected by an additional positioning member of said pair, which is separate from the four positioning members, the two intermediate parts being distributed in the two opposite margin portions.

the positioning members are distributed around the covering portion, and wherein each of the positioning members is configured as a stationary member extending through a protecting body through-slot, the shrink stroke of the two longitudinal sides of the protecting body being able to be limited in two steps as the respective end parts are blocked in position after the one or more intermediate parts are blocked, due to a difference in transverse size of the protecting body through-slots.

the positioning members are distributed around the covering portion.

each of the positioning members is configured as a stationary member (i.e. as stationary reference for the plates of the protecting body which deform to movably contain local expansion(s) of the flexible pouch).

each stationary member extends through a protecting body through-slot, the shrink stroke of the two longitudinal sides of the protecting body being able to be limited in two steps as the respective end parts are blocked in position after the one or more intermediate parts are blocked, due to a difference in transverse size of the positioning members.

the pair of additional positioning members are engaged in two corresponding through-slots of the protecting body, in order to limit shrink stroke of the two longitudinal sides of the protecting body, so that in a filled-state of the flexible pouch sandwiched between the two plates of the protecting body, the covering portion forms two bulges separated by a constriction line extending from one of the two intermediate parts to the other one of the two intermediate parts.

when filling the flexible pouch, the pair of additional positioning members are in abutment engagement in two corresponding ones of the through-slots before any abutment engagement of the four positioning members that are distributed in four corresponding through-slots of the protecting body.

the four end parts have each a position inwardly shifted within one given margin portion of the two margin portions as compared to a middle area of same given margin portion, one of the two intermediate parts being included in the middle area.

the protecting body is made of a freeze resistant polyester or copolyester material that is not brittle at about 25° F. or −4° C.

the material of the protecting body is PET.

the material of the protecting body is TRITAN (i.e. a copolyester compound called TRITAN™, which is a transparent amorphous thermoplastic material, typically made by combining three monomers; some formulations of this material do not contain additives, while others contain about or less than 10% additives).

the material of the protecting body is an amorphous copolyester made by combining the following monomers: dimethyl terephthalate, 2.2,4,4-tetramethyl-1,3-cyclobutanediol, and 1.4-cyclohexanedimethanol.

the two separate protecting parts of the holding and retaining device are interlocked by the positioning members, in order to have the protecting body sandwiched between the two protecting parts and arranged in the interspace that is delimited by the two protecting parts.

one of the intermediate parts abuts inwardly against a stationary surface of a positioning member inserted in through-slot, by an external area of the margin portion that is preferably adjacent to an the assembly for holding a hose (which may be a hose of the pouch).

the two opposite sides of the protecting body are parallel and extend between end edges of the protecting body that are formed at end junctions of the plates.

each of the positioning members is engaged to extend through one of the two opposite margin portions, by extending through at least one cut formed in one of the two margin portions.

the protecting body plane intersects four margin portions distributed in a rectangular shape and each in contact with the two protecting parts of the shell, the four margin portions being arranged around the covering portion, the two opposite margin portions being part of this group.

According to another aspect, embodiments of the invention provides a freeze/thaw containment system for containing a biopharmaceutical composition, the system comprising:

a storage unit such as above mentioned, a flexible pouch sandwiched between the two plates, the flexible pouch preferably containing a biopharmaceutical composition, the flexible pouch being more flexible than material of the protecting body.

In preferred options, the two plates constrain the flexible pouch by the covering portion that extends between the two margin portions, the flexible pouch having two outer sides in contact with the covering portion so that the pouch cannot interfere with the positioning members (the protecting body only consists of the two plates and protection effect is obtained by direct contact of the plates onto the pouch).

According to a particular feature, the two plates comprise, on a peripheral side at least partly included in one of the two margin portions, an assembly for holding a hose connected to the flexible pouch.

Optionally, the system comprises at least one hose comprising at least a portion hold by the assembly for holding a hose, one or more protecting body through-slots that are involved for having the lower clearance range being arranged between the flexible pouch and the assembly for holding a hose.

According to another aspect, embodiments provide a method of assembling the above cited freeze/thaw containment system, which is a protection system for storing and withstanding freezing and thawing of the biopharmaceutical composition contained in the flexible pouch of the freeze/thaw containment system, the method comprising:

sandwiching a flexible pouch between two plates of a protecting body, selectively by a covering portion distributed in the two plates for covering the flexible pouch, the protecting body being configured for protecting the flexible pouch and comprising the two plates, the protecting body further comprising a longitudinal axis and two margin portions at two longitudinal sides of the protecting body, the covering portion separating the two opposite margin portions, the protecting body extending planar at least in an empty state of the flexible pouch, along a protecting body plane, forming a storage unit for use in freezing, storing and thawing biopharmaceutical materials contained in the flexible pouch, by arranging the protecting body between two separate protecting parts of a holding and retaining device, the holding and retaining device including positioning members that are engaged in the two opposite margin portions, the two separate protecting parts of the holding and retaining device being interlocked, preferably by the positioning members, in order to have the protecting body sandwiched between the two protecting parts and arranged in an interspace delimited by the two protecting parts, in a filled state of the flexible pouch, constraining the flexible pouch by the two plates and allowing the protecting body to be displaced in the interspace by movement of the two plates that extend and shrink in a transverse direction belonging to the protecting body plane, the positioning members being distributed longitudinally and limiting shrink stroke of the longitudinal sides of the protecting body by a retaining effect due to engagement of the positioning members with the two opposite margin portions:

at one or more intermediate parts, and at respective longitudinal end parts of the two opposite margin portions, wherein a lower clearance range is provided for the engagement of the positioning members at the one or more intermediate parts, so that shrink stroke of the two longitudinal sides of the protecting body, due to filling of the flexible pouch sandwiched between the two plates of the protecting body, is less limited at the respective end parts than at the one or more intermediate parts.

In some options, the flexible pouch is inflated when filling the flexible pouch with the biopharmaceutical composition in a fluid state, and each covering portion is constraining a middle of the flexible pouch more than two opposite ends of the flexible pouch, due to a first relative displacement between first positioning members and first protecting body through-slots that interact with the first positioning members, the first protecting body through-slots being provided in an intermediate position in each of the margin portions, wherein the first relative displacement is less than a second relative displacement between second positioning members and second protecting body through-slots that interact with the second positioning members, each of the second protecting body through-slots being provided in one of the longitudinal end parts of the margin portions.

In some embodiments, the positioning members are provided with:

a first interlocking assembly having interlocking members that are configured for attaching two intermediate parts of the two margin portions to the holding and retaining device, in a side position within a first clearance range, the first clearance range being measured in a direction perpendicular to the longitudinal axis and parallel to the protection body plane;

a second interlocking assembly having interlocking members that are part of the positioning members and configured for attaching four respective end parts, which are distributed in the two margin portions, to the holding and retaining device, in an adjustable position that is adjustable within a second clearance range, the second clearance range being measured in a direction perpendicular to the longitudinal axis and parallel to the protection body plane;

and wherein the first clearance range is lower than the second clearance range, so that in the filled-state of the flexible pouch sandwiched between the two plates of the protecting body, the respective end parts are able to move inwardly more than the two intermediate parts.

Typically, the second clearance range may be sufficient to allow, in a filled-state of the pouch sandwiched by the plates, the respective end parts to be still moved inwardly due to freezing of the aqueous liquid contained in the pouch (i.e. due to water expansion when it freezes).

Other features and advantages of the invention will become apparent to those skilled in the art during the description which will follow, given by way of a non-limiting example, with reference to the appended drawings.

DETAILED DESCRIPTION OF EMBODIMENTS

In the various figures, the same references are used to designate identical or similar elements.

In FIGS. 1 to 12, a vertical direction, a longitudinal direction and a lateral direction are based on the freeze/thaw containment system horizontally stored in a shelf. A direction perpendicular to the longitudinal direction is the lateral direction. One direction according to the height of the freeze/thaw containment system 1 is the vertical direction, reflected by direction Z in the FIGS. 1-2 and 8 in particular.

Figure 1:
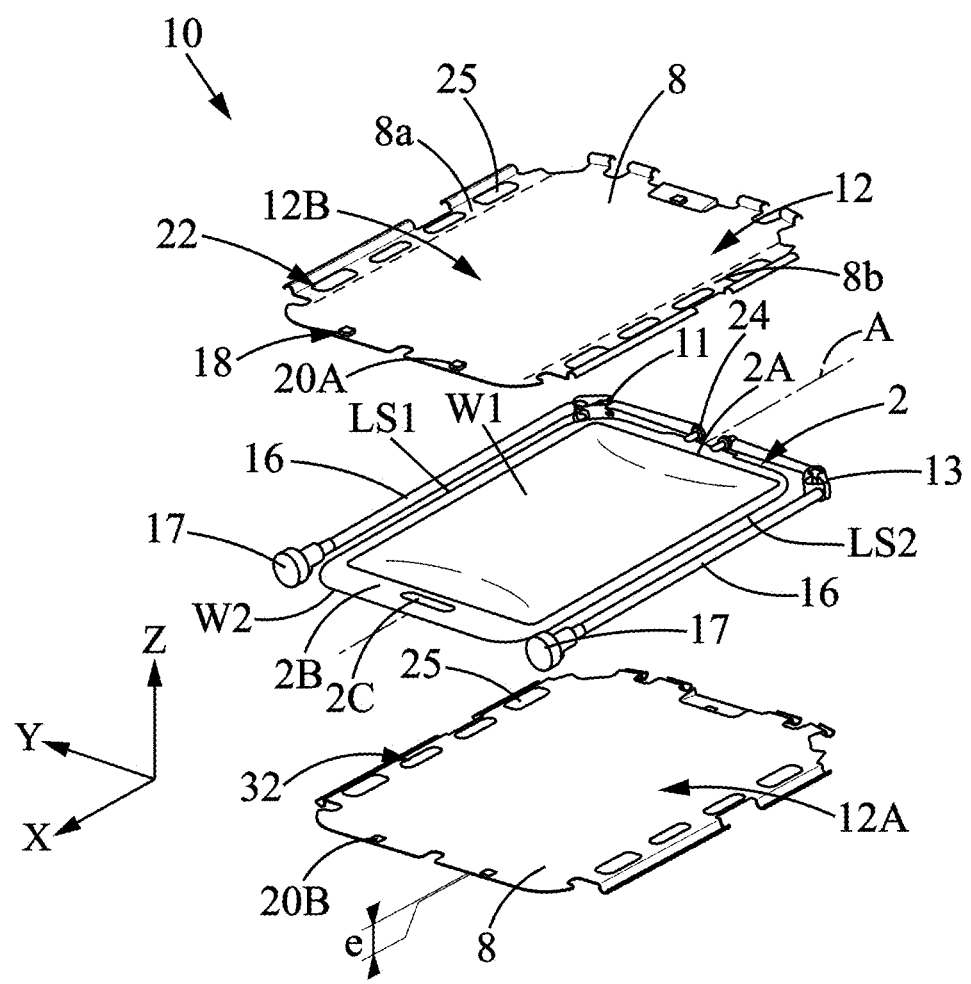
FIG. 1 is a perspective view of a system for containing a biopharmaceutical fluid according to an embodiment of the invention, in a configuration with the protecting body disassembled.

As illustrated in FIG. 1, a flexible pouch 2 may be directly protected by two plates 12A, 12B of a protecting body 12. The flexible pouch 2 is typically a 2D-type pouch, delimited by two longitudinal sides LS1, LS2 and having a substantially rectangular shape without predefined folds on its two main outer faces. The pouch 2 extends substantially planar in non-filled state. The pouch 2 may have two main walls W1, W2. These walls W1, W2 may be directly welded one to each other at a weld or peripheral seal J to delimit an interior volume for containing the biopharmaceutical fluid. More generally, the flexible pouch 2 may be of any suitable material for containing biopharmaceutical materials and forms a freezer bag.

The flexible pouch 2 extends in a main plane XY which is, here, the horizontal plane. The pouch 2 has a longitudinal axis A parallel to its long sides, which are here the two longitudinal sides LS1, LS2.

Figure 2:
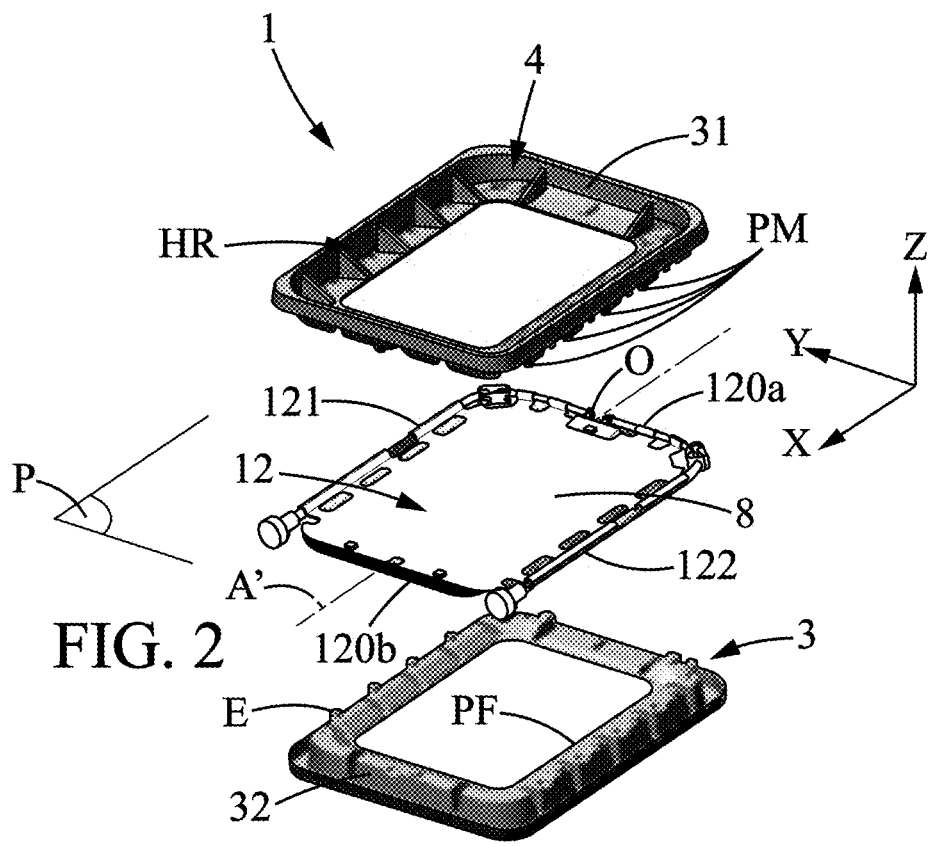
FIG. 2 shows the system of FIG. 1 assembled, in a perspective view, with two separate protecting parts ready to be assembled to form a freeze/thaw system.
Figure 8:
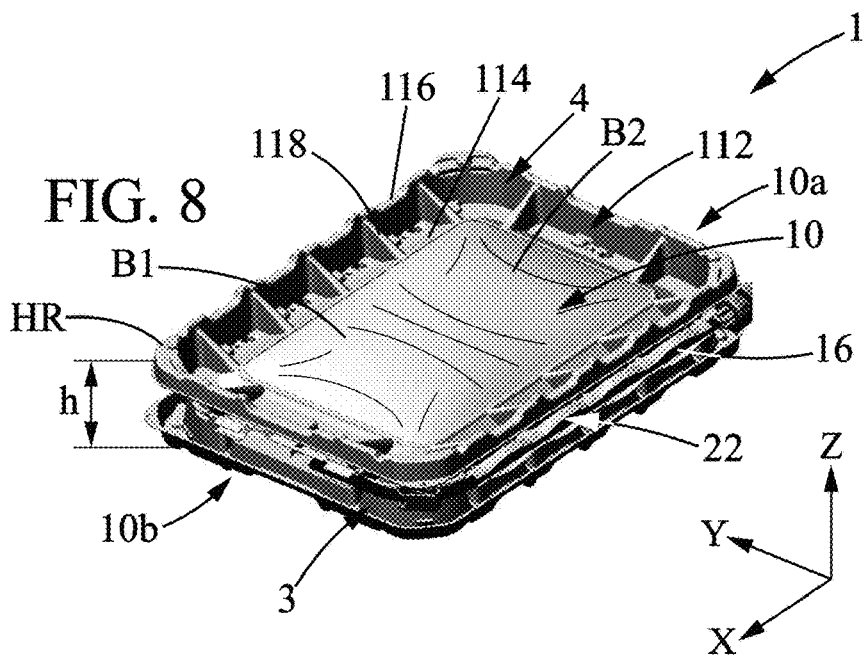
FIG. 8 is a perspective view showing a complete freeze/thaw system in an exemplary embodiment of the invention.

In FIGS. 2 and 8, it can be seen that the pouch 2 may be housed in a storage unit 10. This storage unit 10 comprises the protecting body 12 and a protective shell HR made of two protective parts 31, 32. Optionally, the pouch 2 may be of the Celsius® FFT type, and thus is a sterile, single-use, disposable container, adapted to be enclosed by two frames 3, 4, or similar thermoformed shell.

The storage unit 10 is part of the freeze/thaw containment system 1, which includes the flexible pouch 2 and at least one hose 16 connected to the flexible pouch 2. Referring to FIGS. 2 and 8, it is understood that the pouch 2 and the hose(s) 16 are sandwiched between two superimposed pieces forming a top 10a of the storage unit 10 and two other superimposed pieces forming the bottom 10b of the storage unit 10. Each group of superimposed pieces, which is formed by a shell part 31 or 32 and a plate 12A or 12B, is typically obtained after a step of wrapping the flexible pouch 2 by the two plates 12A, 12B of the protecting body 12. In other words, the protecting body 12 may be firstly assembled and, then the two protective parts 31, 32 are assembled to form the shell HR.

The protecting body 12 and the flexible pouch 2 comprise a longitudinal direction X and a transversal direction Y. The protecting body 12 and the flexible pouch 2 comprise each longitudinal and transversal sides. The longitudinal axis A' of the protecting body 12 may be placed in a median vertical plane separating two symmetrical halves for each plate 12A, 12B of the protecting body.

The flexible pouch 2 is specifically designed to be able to contain up to 100 liters of biopharmaceutical fluid. However, the flexible pouch 2 can have a maximum volume capacity which is different, for example of 5 liters, 10 liters, 20 liters or 50 liters. The pouch 2 optionally includes one or more tubes joined to a front end (at a transversal side) that extends transversally relative to the longitudinal sides LS1, LS2. More generally, the pouch 2 may comprise one hose/tube or any suitable number of tubes 16 that are connected to a periphery of the useful part of the pouch 2. This useful part is here formed by the two main walls W1, W2.

Referring to FIG. 1, two hoses or tubes 16 are typically connected to a front edge 2A of the flexible pouch 2. A rear edge 2B of the flexible pouch 2, at a longitudinal end opposite to the front longitudinal edge 2A, may extend substantially parallel to the front edge 2A. While the tubes 16 may be bent and have a length superior to length of the longitudinal sides LS1, LS2 of the pouch 2, any size of hose may be used. Each hose 16 may be maintained in a position coinciding with the protecting body plane, by attachment to a peripheral support provided in at least one amongst:
- the protecting body 12 made of plastic material less flexible than the pouch 2, and
- the protective shell HR.

Each hose 16 is provided with a connector 17 for fluid connection, typically a connection to another biopharmaceutical device. The connectors 17 thus make it possible to fluidly connect the flexible pouch 2 to another element, for example a tank. The longitudinal rear side 120b of the protecting body 12 may extend between the two connectors 17.

Referring to FIGS. 2 and 8, the protective shell 10 is arranged so as to delimit an interspace extending along the protecting body plane P, so that the connectors 17 and the tubes 16 are not sandwiched by the two protecting parts forming the protective shell 10. Such interspace is also suitable to allow expansion of the protecting body 12 along Z-axis, here vertically.

The flexible pouch 2 can inflate during filling operation, which means that the circumference of two main walls W1, W2 as considered in the pouch plane is decreasing due to inward movement, also known as shrink stroke, of the different sides. Here, in horizontal configuration of the system 1 as illustrated in FIG. 8, four pouch sides can be displaced inwardly due to the vertical expansion (along Z-axis).

Referring to FIG. 1, the pouch expansion is limited and controlled by the protecting body 12, due to lower flexibility of the material of the two plates 12A, 12B. The protecting body is made of a freeze resistant polyester or copolyester material that is not brittle at about 25° F. or −4° C. This material is for instance PET or a robust copolyester of TRITAN™ type.

The protective shell HR may be obtained by assembling frames 3, 4 of annular shape. The frames 3, 4 are two pieces, which here form separate protecting parts distributed above and below the protecting body 12, respectively.

As illustrated in FIG. 1, the flexible pouch 2 typically comprises, here along one of the transversal sides, a through-hole 2C which can form a handle for the flexible pouch 2. Mainly, the through-hole 2C may be used to attach the two frames 3, 4 or similar protecting parts to each other such that each frame 3, 4 covers the corresponding external surface of one of the two plates 12A, 12B. But other holes provided in the plates 12A, 12B may also be used for same purpose.

More generally, the attachment device comprises one or more cross members that are configured to maintain the frames 3, 4 in the assembled state. Such cross members are engaged with a retaining effect between the two frames and the attachment means may be in a locking state, in which the cross members cannot move or slide through the protecting body, in order to prevent vertical separation of the shell frames 3, 4. Typically, a plurality of through-holes may be provided in the protecting body 12 and such holes provide each a free space through which at least one attachment/cross member can be arranged to attach the protecting parts or frames 3, 4 to each other. Hence, the system 1 is reinforced, which is especially relevant regarding shipping for example. The frames 3, 4 may also have holes distributed along frame sides and each in alignment with corresponding through-holes of the protecting body 12.

Figure 3:
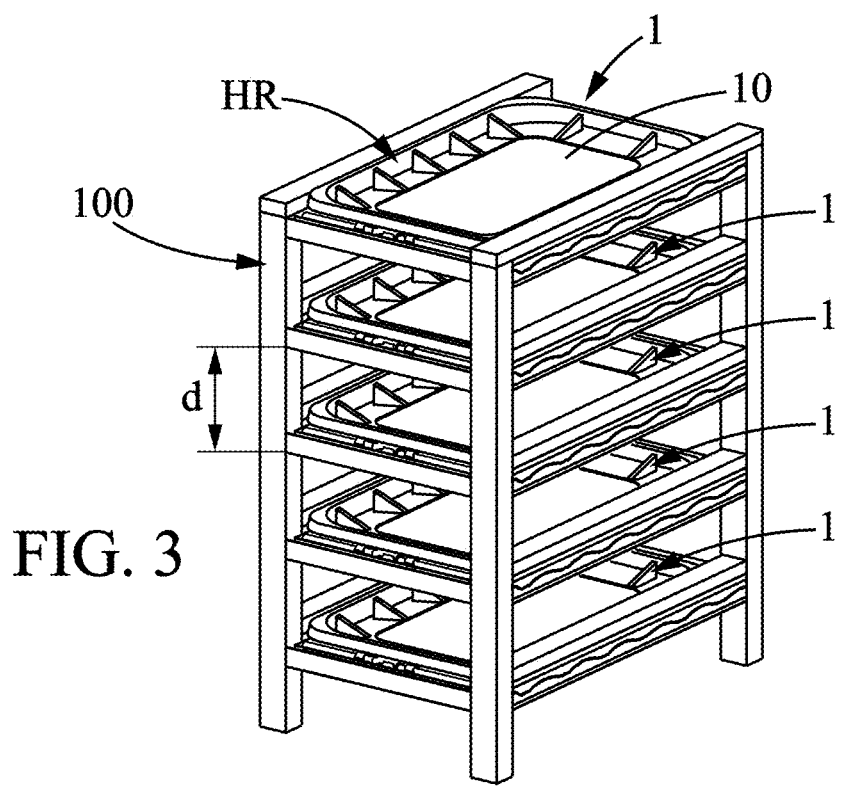
FIG. 3 illustrates several freeze/thaw systems, each of the type illustrated in FIG. 2, which are stored on a shelf.

It is understood that the two plates 12A, 12B are rigid enough to constrain the shape of the flexible pouch 2 such that the protecting body 12 occupies a minimum volume. This is particularly advantageous for storage or shipping. For example, as illustrated in FIG. 3, a device or shelf 100 can hold a plurality of freeze/thaw systems 1 for containing a biopharmaceutical fluid, without losing to much space (interspaces d are here exaggerated for purpose of illustration, interspace being typically matching with small height h of the shell HR). The device 100 can optionally holds five systems 1 stored on a shelf.

More generally, the flexible pouches 2 can be frozen, thawed, filled or emptied simultaneously when they are stored on such kind of device 100. When the flexible pouches 2 are stored, the biopharmaceutical fluid can be frozen or thawed. When the flexible pouches 2 are shipped, most often, the biopharmaceutical fluid is thawed even if the biopharmaceutical fluid can as well be frozen.

However, the two plates 12A, 12B are also flexible enough to allow the protective body 12 to locally have a thickness, in or near a central area, which is greater than in a circumferential area. The latter comprises the longitudinal sides 121, 122 and transversal sides 120a, 120b. Thus, when the biopharmaceutical fluid is frozen, the containing region or useful part of the flexible pouch 2, i.e. inner region relative to the peripheral seal J, may be slightly curved. Hence, a dimension on the longitudinal direction (X) of the protecting body 12 slightly decreases. In this case, the biopharmaceutical fluid slightly is constrained by the two plates 12A, 12B.

In accordance with preferred embodiments, the plate dimension reduction (as considered in XY plane) is obtained with a profile of shrink strokes, such reduction being adjusted to be different, depending on longitudinal positions of some positioning members that locally prevent or limit such dimension decrease, for a control of the shrink stroke.

While FIG. 3 shows a solution for horizontal storage, it is understood that the pouch 2 can also be stored vertically or along any suitable direction, thanks to a storage unit 10. A sliding structure may be used for having the protected pouch (in frozen state) carried by an annular frame or similar holding means that can extend vertically for storage purposes.

Particular Structure and Features of the Protecting Body

Referring to FIGS. 1-2, 4-6 and 11, the plates 12A, 12B may define the protecting body 12, preferably without any additional piece. As illustrated in FIGS. 1-2 in particular, the protecting body 12 may have a covering portion 8 for covering the pouch 2 and two opposite margin portions 8a, 8b at two longitudinal sides 121, 122 of the protecting body 12. In non-filled state of the pouch 2, the protecting body 12 extends flat along a protecting body plane P. The protecting body 12 may be transparent, the pouch 2 being also transparent for instance. The protecting body is a thin body, as the plates 12A, 12B may be compared to sheets of relatively low flexibility, the plates being made of same material. The thickness e of each plates 12A, 12B is lower than a minimal thickness of the frames 3, 4. The plates 12A, 12B can have a general curvature but cannot easily folding (flexibility being substantially as low as PET).

The plates 12A, 12B form each a stiffening layer when overlapping, and preferably entirely covering, the main walls W1, W2. The thickness e of each plate 12A, 12B before Thermoforming is of about 1.27 mm and thus may be lower than 2 mm, with provision that the plastic material of the plates has a density superior to 1.10 g/cm$^3$, preferably superior to 1.15 g/cm$^3$ (typically without being above 1.5 or 1.6 g/cm$^3$). Plate material may have a tensile strength at break, which is typically between 45 and 75 MPa, for example in the range 50-60 MPa, typically 52-59 MPA (standard test ASTM D638).

The protecting body 12 comprises two substantially planar plates 12A, 12B that are each made of a single piece. The planar plates 12A, 12B extend also in a plane parallel to the main plane XY. The plate 12A forms a lower surface and the plate 12B forms an upper surface, with respect to the vertical axis Z. In preferred embodiments, the two plates 12A, 12B are identical and symmetrically face each other, with respect to the main plane XY.

While the illustrated embodiments show a protecting body 12 covering entirely the two main walls W1, W2 by the covering portion 8, other size may be used for the covering portion 8. For instance, the protecting body 12 could only cover a transverse band portion of each wall W1, W2, at a distance from the pouch edges 2A, 2B. Besides, one ore more complementary protecting bodies could be used to cover at least one of the end parts of the walls W1, W2.

Referring to FIG. 1, the protecting body 12 is also provided with an attachment device for fixing the two plates 12A, 12B to each other. The plates 12A, 12B may be removably fixed to each other by an attachment system 18 that can be specifically seen in FIGS. 1-2.

Optionally, the attachment system 18 may comprise a plurality of snap buttons 20. One of the two plates 12A, 12B comprises a first element 20A of one snap button 20 and the other plate comprises a second complementary element 20B of one snap button 20. The second element 20B (possibly a male element) engages the first element 20A (possibly a female element) in a direction parallel to the vertical axis Z.

Alternatively, the attachment system 18 is a non-removable system, which means that, once the two plates 12A, 12B are fixed to each other, it is not possible anymore to detach the two plates 12A, 12B one from each other.

In the non-limiting embodiment of FIGS. 1-2, the protecting body 12 comprises snap buttons 20 on transversal sides 120a, 120b and on the two margin portions 8a, 8b (typically between the covering portion 8 and the longitudinal sides 121, 122). Accordingly, each of the two plates 12A, 12B is provided with the complementary members of these snap buttons 20, which are symmetrically arranged on the transversal ends of the two plates 12A, 12B. The protecting body 12 may comprise more snap buttons 20 on the front side 120a that in the rear side 120b. Typically, the two opposite margin portions 8a, 8b may be considered as part of a fastening assembly provided to prevent any shifting in position between the two plates 12A, 12B once they are mutually fastened at least in the two margin portions 8a, 8b.

Figure 5:
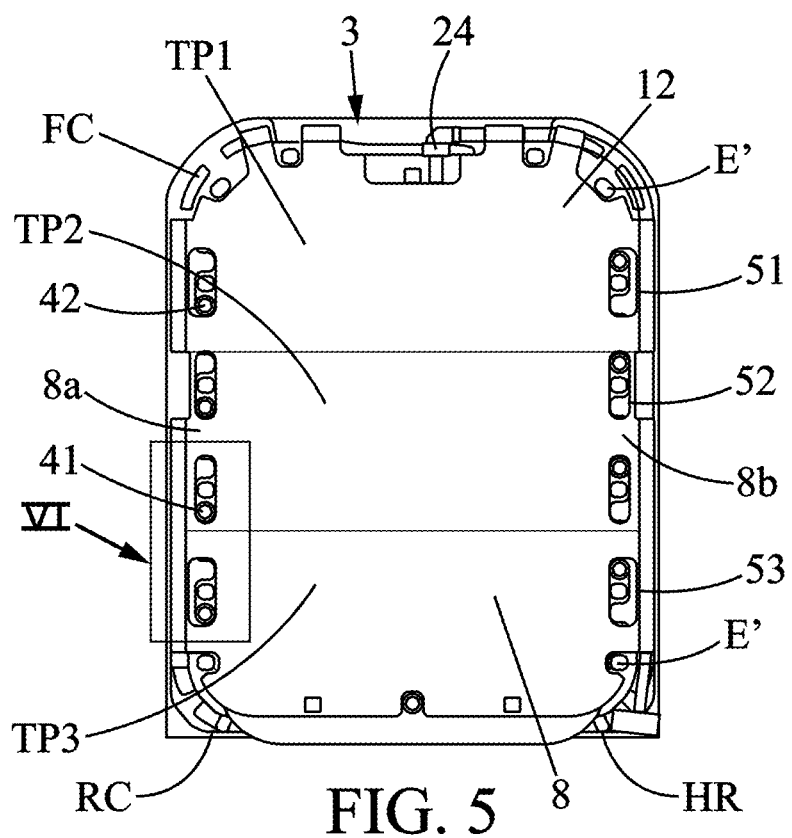
FIG. 5 is a top view of a freeze/thaw system according to a first embodiment, with a shell protecting part removed for illustrating cooperation between the protecting body and the shell protecting part forming a bottom of the system.

As can be seen on FIGS. 5 and 8, when the two plates 12A, 12B are fixed to each other, they sandwich the flexible pouch 2. The planar plate 12A, which forms the lower surface of the protecting body 12, presses the lower surface of the flexible pouch 2, with respect to the vertical axis Z. Similarly, the planar plate 12B, which forms the upper surface of the protecting body 12, presses the upper surface of the flexible pouch 2, with respect to the vertical axis Z. The two plates 12A, 12B have planar dimensions which are substantially identical to the ones of the flexible pouch 2.

The freeze/thaw system 1 may be optionally provided with clamps, here two clamps 11, 13. Each clamp 11, 13 is located near to a corner between the front edge 2A of the flexible pouch 2 and a long side or similar longitudinal edge. Each clamp 11, 13 respectively pinches one hose 16 at a straight angle. Thus, each plate 12A, 12B may comprise a cut-out located at each corner between its front I edge and adjacent edge parallel to the longitudinal axis A. These cut-outs create a free space that can be occupied by the clamps 11, 13.

Thus, in the embodiments illustrated in FIGS. 1-2, each of the two plates 12A, 12B has a substantially rectangular shape with two cut-outs respectively on one corner that is called hereafter front corner.

As shown more particularly on FIG. 1, the rear longitudinal edge 2B and a portion of the through hole 2C are not sandwiched by the two plates 12A, 12B. This part of the flexible pouch 2 is flat and does not comprise biopharmaceutical fluid. Indeed, the rear longitudinal edge 2B comprises two films which are welded one to each other. Hence, the biopharmaceutical fluid in a part of the flexible pouch 2 which is protected by the two plates 12A, 12B.

The two plates 12A, 12B are more rigid than the flexible pouch 2. Consequently, when the two plates 12A, 12B sandwich the flexible pouch 2, they constrain the flexible pouch 2. Thus, the protecting body 12 and the flexible pouch 2 are substantially planar (and may be strictly planar in non-filled state). With such generally flat configuration and containment effect, the protecting body 12 cannot bulge beyond the outer limits of the protective shell HR.

The containment effect is obtained when the two plates 12A, 12B sandwich the flexible pouch 2 with respect to the main plane XY. But it is understood that the protecting body 12 is not fully wrapping the pouch, so that it comprises, on a peripheral side, at least one opening O for accessing the flexible pouch 2. More generally, the protecting body 12 comprises at least one opening on the peripheral side. As shown in FIGS. 1-2, the opening O is able to receive at least one port 24 mounted to one hose 16 to fluidly connect the interior and the exterior of the flexible pouch 2. Here a part of the front edge is thus accessible.

Furthermore, the protecting body 12 optionally comprises an assembly 22 for holding the two tubes 16. The two plates 12A, 12B comprise, on their peripheral sides, complementary parts (complementary shape along Z direction, for instance) which form the assembly 22 for holding the tubes 16.

Each of the tubes 16 is connected to the flexible pouch 2 by a port. Two front ports 24 may be provided. For example, one port 24 forms an inlet for the flexible pouch 2 and the other port 24 forms an outlet of the flexible pouch 2. The assembly 22 for holding the two tubes 16 is symmetrically arranged with respect to the longitudinal direction X (i.e. pouch longitudinal axis A which typically coincides with axis A'). Each symmetrical part is able to hold one hose 16.

Now referring to FIGS. 1-6, it can be seen that the two plates 12A, 12B may also comprise through holes 25, for instance regularly arranged on the peripheral sides of the two plates. The through-holes 25 coincide, in the assembled state of the protecting body 12, and extend in the margin portions 8a, 8b, in order to form protecting body through-slots 51, 52, 53 that do not interfere with the pouch 2. More generally, protecting body through-slots 51, 52, 53 or any kind of reliefs are provided in one or more of the margin portions 8a, 8b, in order to cooperate with complementary elements adapted to restrict expansion by preventing or limiting inward displacement of the longitudinal sides 121, 122. Such elements form positioning members PM because they are involved in determining the final position of longitudinal side sections at the end of the filling of the flexible pouch 2, typically by abutting against an outer edge included in a margin portion 8a or 8b.

The plates 12A, 12B here have same thickness e, as illustrated in FIG. 1, which is a constant thickness in the plate contact part for contact with the pouch (which here forms the covering portion 8). Such thickness e may be also present in the margin portions 8a, 8b in the regions provided with the through-slots 51, 52, 53. In some variants, the margin portions 8a, 8b, may be reinforced by at least one additional stiffening layer.

Length of the two opposite margin portions 8a, 8b is here substantially the same. Such length may be for example superior to 250 or preferably superior to 350 mm, which of interest to provide at least three through-slots (51, 52, 53; 52', 54) regularly distributed in at least one margin portion, preferably in all of these margin portions 8a, 8b, while having excellent robustness. This length may correspond to more than 75% of the total length L of the pouch 2, before filling the pouch 2.

Shell Forming All or Part of the Holding a Retaining Device

Referring to FIGS. 2-3, 5-6 and 8, the storage unit is provided with a shell HR. This protective shell HR may be made of semi rigid plastic material or rigid material. HDPE shell may be preferred. It may be pre-assembled in some options. An annular shape is optionally provided to allow visual inspection of the expansion of the plates 12A, 12B extending (transversal to direction Z) between the shell parts or frames 3, 4.

Referring to FIG. 8, each frame 3, 4 of annular shape has a peripheral inner edge 114 and a peripheral outer edge 116, with respect to the opening. Here, the peripheral inner 114 and outer 116 edges do not belong to a same plane parallel to the main plane (XY). Between these peripheral inner 114 and outer 116 edges, each frame 3, 4 typically comprises a plurality of structural reinforcement bodies 118 which link the two edges and which are regularly arranged on longitudinal and transversal sides of an external surface, with respect to the flexible pouch 2, of each frame 3, 4.

Due to the discrete interlocking areas between the two frames 3, 4 near a circumference of the protecting body 12, and since a respective interior recess is provided in each of the frames 3, 4 (see FIG. 10 in particular), the protecting body 12 can be displaced in the interspace delimited by the frames 3 and 4 of the shell HR, especially in plane XY. This arrangement of the shell HR allows the two plates 12A, 12B moving, extending, and shrinking in a transverse direction belonging to the protecting body plane P.

Here, as illustrated in FIG. 2, a holding and retaining device is obtained in assembled state of the shell HR, due to positioning members PM provided in the shell HR. The positioning members PM are distributed longitudinally, in order to cooperate with the through-slots 51 52, 53, also distributed longitudinally, preferably with regular longitudinal spacing. Each protecting part or frame 3, 4 used to form the shell HR has a proximal face PF, here of annular shape, adapted to be in contact with the two margin portions 8a, 8b.

Figure 10:
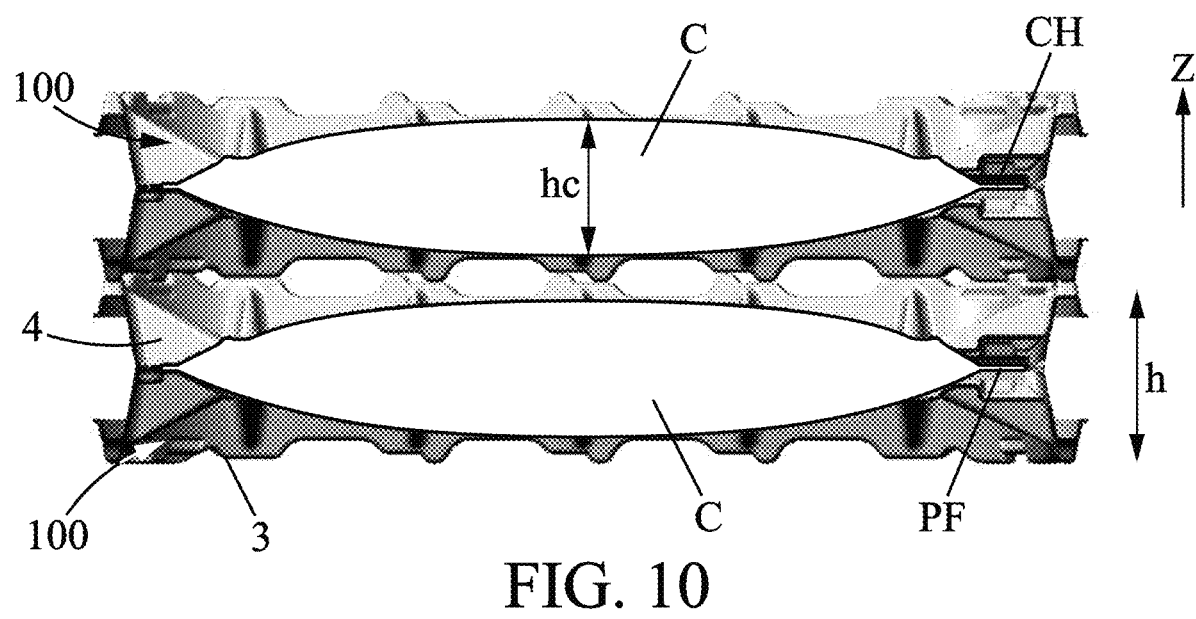
FIG. 10 is a sectional view of two second systems stacked one on each other.

Referring to FIG. 10, in assembled state, the shell HR delimit a cavity C of maximum height hc (measured along direction Z), which is typically sufficient to receive the pouch 2 covered by the thin protecting body 12. One or two channels CH typically extend in a position intermediate between two front corners FC of the shell HR, in order to guide and maintain tubular connectors 24 of pouch 2 that are typically not covered by the protecting body 12. The arched housing formed by the shell HR, corresponding to cavity C of increased height with spacing from the circumference, is compatible with expansion due to filling, and is also of interest for good protection, while minimizing vertical bulk.

The positioning members PM may comprise insertion elements E configured as protrusions vertically protruding (along Z-direction) from such proximal face PF. In assembled state of the storage unit 10, a first protecting part or frame 3 of the shell HR has a first number of insertion elements E to be inserted into a corresponding cavity provided in the facing proximal face of the other/second protecting part or frame 4, while being engaged in the through-slots 51, 52,53. Each of the insertion elements belongs to the positioning members PM and is suitable to limit or prevent inward movement along Y direction of the protecting body 12, by abutment contact.

Similarly, the second protecting part or frame 4 of the shell HR has a second number of insertion elements E (possibly equal or not to the first number) to be inserted into a corresponding cavity provided in the facing proximal face of the first protecting part or frame 3, while being engaged in the through-slots 51, 52,53.

This is of interest for ensuring that a given final position is obtained at respective longitudinal side sections/areas of the protecting body 12, at the end of the filling of the flexible pouch 2. Since such position is known in advance (predetermined position), pouch expansion can be indirectly controlled by the positioning members PM, via limiting/retaining effect onto the margin portions 8a, 8b of the protecting body 12.

The frames 3, 4 are well adapted for a stacking configuration of a pair of plates 12A, 12B, which are here stacked on a bottom shell frame 3, with interlocking or pins (forming the positioning members PM) of this shell frame passing through the plate cuts forming the slots, in order to control protecting body shrink in plane XY. Optionally, a same protecting body slot 51, 52, 53 or 52', 54 may be crossed by a pair of pins distributed in the two parts or frames 3, 4 used for holding and retaining the protecting body 12.

Figure 11:
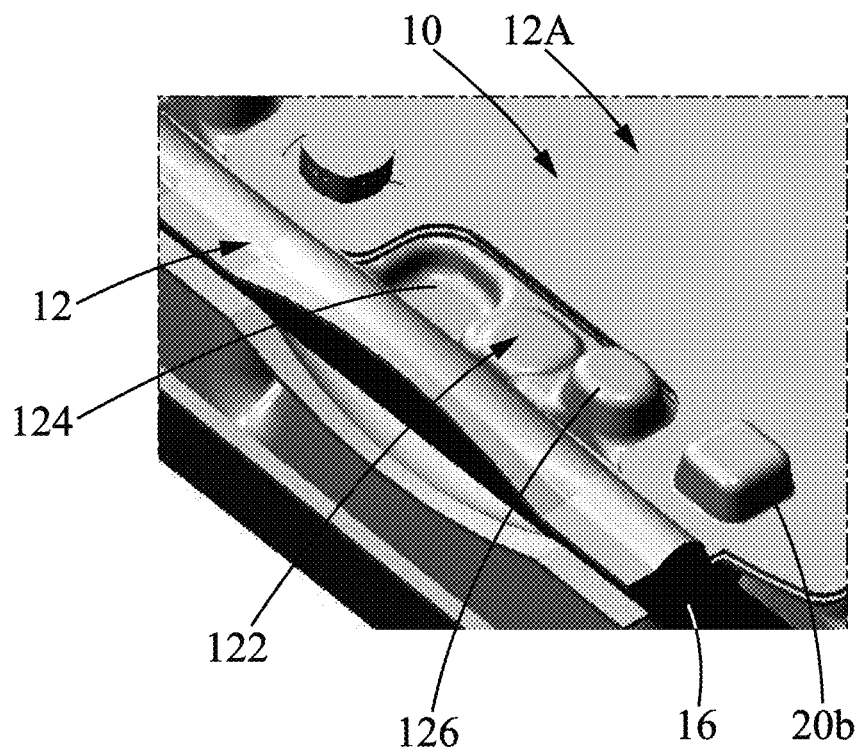
FIG. 11 is a perspective view of a detail of the freeze/thaw system of FIG. 5.

Referring to FIG. 11, the protecting body 12 comprises at least one assembly 120 for pinching at least a portion of the two plates 12A, 12B. The assembly 120 comprises two complementary bodies 120A, 120B respectively carried by the two frames 3, 4. When the two frames 3, 4 are fixed to each other, as illustrated on FIG. 12, they are close enough to prevent any vertical movement of a portion of the protecting body 12. They may pinch such portion, but without blocking shrink displacement.

Furthermore, as shown on FIGS. 2 and 11, the internal surface, with respect to the flexible pouch 12, of each frame 3, 4 comprises a plurality of bodies 122 regularly arranged along the transversal sides of the two frames 3, 4. As particularly shown on FIG. 11, these regular bodies 122 may be complementary to the assembly 22 for holding the tubes 16 and the through holes which form the handle system 32. Hence, when the protecting body 12 is surrounded by the two frames 3 4, there is no free space between the assembly 22 for holding the tubes 16 and the other part of the plates 12A, 12B.

Figure 12:
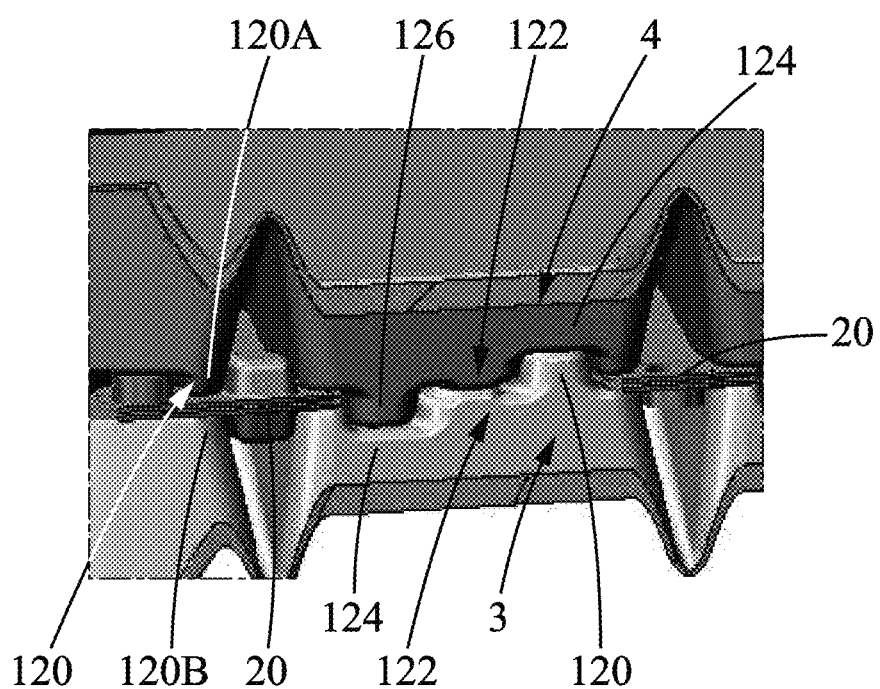
FIG. 12 is a view showing an optional cooperation, in a freeze/thaw system, between rigid or semi rigid positioning members of complementary shape that belong to the shell and cuts or through slots of the protecting body.

Moreover, as can be seen on FIG. 12, each body 122 of the lower frame 3 comprises a recess 124 and a protrusion 126 on an upper surface, with respect to the vertical axis Z. These recesses 124 and protrusions 126 are complementary to the ones carried by identical bodies of the upper frame 4. These assemblies allow the two frames 3, 4 being positioned one to each other.

In some options, such kind of assembly or any suitable interlocks means may be used for forming the members E or similar positioning members, whose one part is used to form stoppers 41, 41'. At least two stoppers 41, 41' may be used to have a repartition of a stopping effect for stopping inward displacement of a protecting body margin portion, such stopping effect being of interest for a same middle region/intermediate part 82 of a margin portion 8a, 8b.

While the illustrated embodiments show insertion elements E provided in the two frames 3, 4 or similar protecting parts covering at least the margin portions 8a, 8b, it is understood that any one amongst the first frame 3 and the second frame 4 may include a plurality of inserting pins or similar insertion elements E that are inserted via the protecting body through-slots 51, 52, 53, so as to come in direct contact with receiving adjustment members of the other one amongst the first frame 3 and the second frame 4.

Other elements E' may extend cross a peripheral part of the protecting body 12, without any retaining effect, for purpose of correctly positioning the protecting body 12 in the interspace of the shell HR, before the filling. Such elements E' may be provided in the respective front corners FC and/or in the respective rear corners RC and/or along front edge and rear edge of the shell HR.

The shell HR may consist in two frames 3, 4 that have each four corner portions FC, RC, due a generally rectangular outer circumference. The positioning members PM, here configured as stationary members, typically include a first group of positioning members 42 located adjacent one of the four corner portions FC, RC, by extending away from a middle part of the shell HR. The positioning members PM also comprise a second group of positioning members 41, which is complementary relative to the first group.

All or parts of the positioning members PM are stoppers for providing strokes limitation between the stoppers and the holding and retaining device HR or HR'. The stoppers are involved to create a belt effect, separating two bellies or bulges B1, B2. The stoppers may be those of the positing members 41 that are crossing a respective one of the margin portions at or close to the center of this margin portion 8a or 8b.

Figure 4:
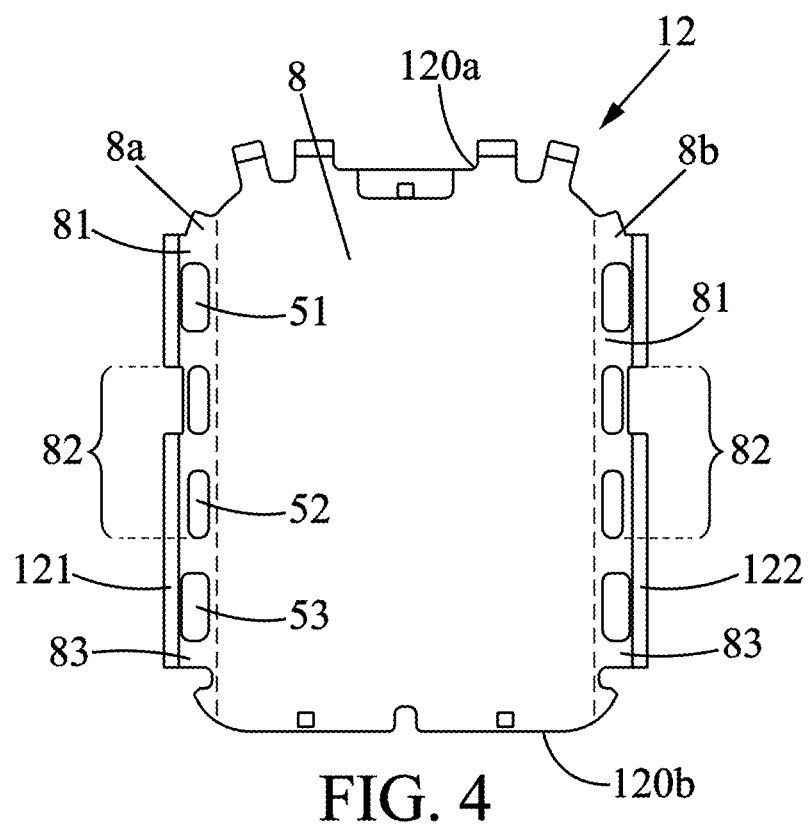
FIG. 4 is a top view of a protecting body, so as to show a top plate thereof, the protecting body being provided with narrow cuts and cuts of wider extension along a shrink direction of the protecting body.

The holding and retaining device HR or HR' may comprise at least three positioning members PM distributed on each of the longitudinal sides 121, 122. FIGS. 2, 5 and 8 show an arrangement with four positioning members PM for cooperating with a corresponding margin portion 8a or 8b, with typically two central stoppers corresponding to the positioning members 41 arranged away from the corners FC, RC and possibly separated by a median transverse plane (here along direction Y) of the storage unit 10. Referring to FIGS. 4-5, the central stoppers 41 are configured to cooperate with a corresponding protecting body through-slot 52 of a margin portion intermediate part 82. The two other positioning members 42 are cooperating with a trough-slot, 51 or 53 respectively, arranged in a margin portion end part, 81 or 83 respectively.

Each frame 3 or 4 of the shell HR may have a proximal face PF in contact or close (less than 2, 3- or 4-mm distance) to the facing proximal face PF of the other frame 4 or 3, while height of the shell HR is typically greater than 40 or 50 mm, for example about 65 mm. The width of the shell HR (along direction Y) may be typically greater than 200 or 250 mm, for example about 554 mm. It is understood that ratio e/h is typically inferior or equal to 1:100 or inferior or equal to 1:200.

Figure 7A:
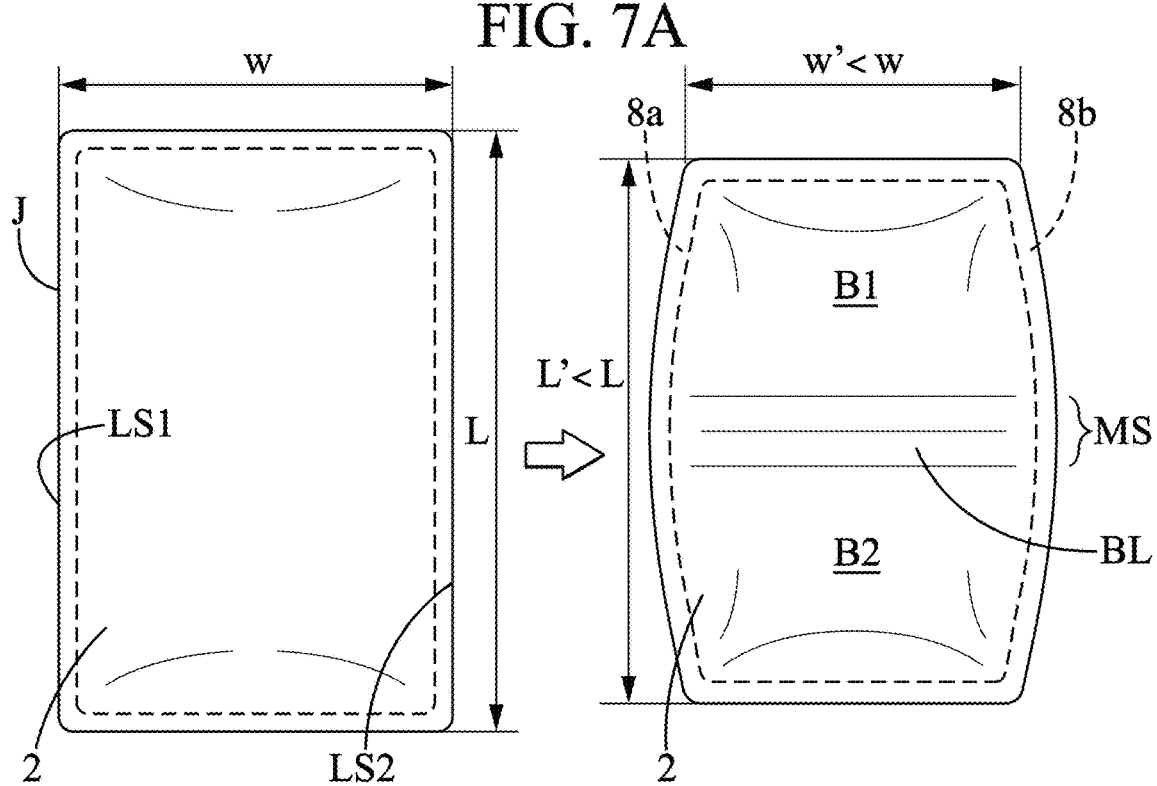
FIGS. 7A and 7B respectively show a top view and a side view of the flexible pouch filled with liquid inside the system of FIG. 5 without illustrating the protecting body and the shell parts.
Figure 7B:
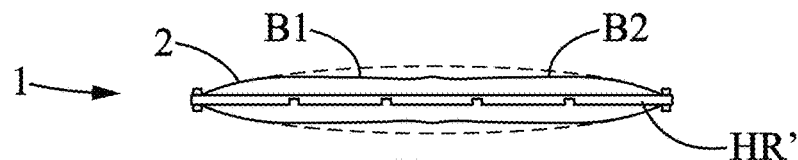

Besides, it can be seen in FIG. 7B that the holding and retaining device HR' can also be made thinner than the flexible pouch 2 in a filled state, according to a variant. Two additional shell pieces may cooperate with such frame-like holding and retaining device HR' if it is desirable to cover the whole height of the system 1. A pinching or any suitable compressing/pressing mechanism may be used for have the plates 12A, 12B mutually fastened. Optionally, a guiding of the fastening members by an external device or shell can be used to limit stroke at the shrinking of the protecting body, in order to similarly limit expansion in a middle area, due to a limited guide stroke in intermediate parts of the margin portions 8a, 8b. In some options, the external device could form a slide, possibly forming a stationary part belonging to the shelf such as illustrated in FIG. 3.

Details of Embodiments for Controlling Pouch Expansion

Now referring to FIGS. 4-6 and 9, the holding and retaining device of the storage unit 10 has one or more positioning members 41 or 41', acting as stoppers only in the two intermediate parts 82 of the protecting body 12. The protecting body through-slots 52 or 52' have such a position (here with width as low as possible, along Y direction), relative to the position of the stoppers 41, 41', that no significant stroke of inward displacement is allowed for the intermediate parts 82. As a result, since stroke is allowed in regions closer to the corners, here in the end parts 81, 83, the pouch 2 covered by the containment protecting body 12 cannot form a single belly or bulge in the middle thereof.

Figure 6:
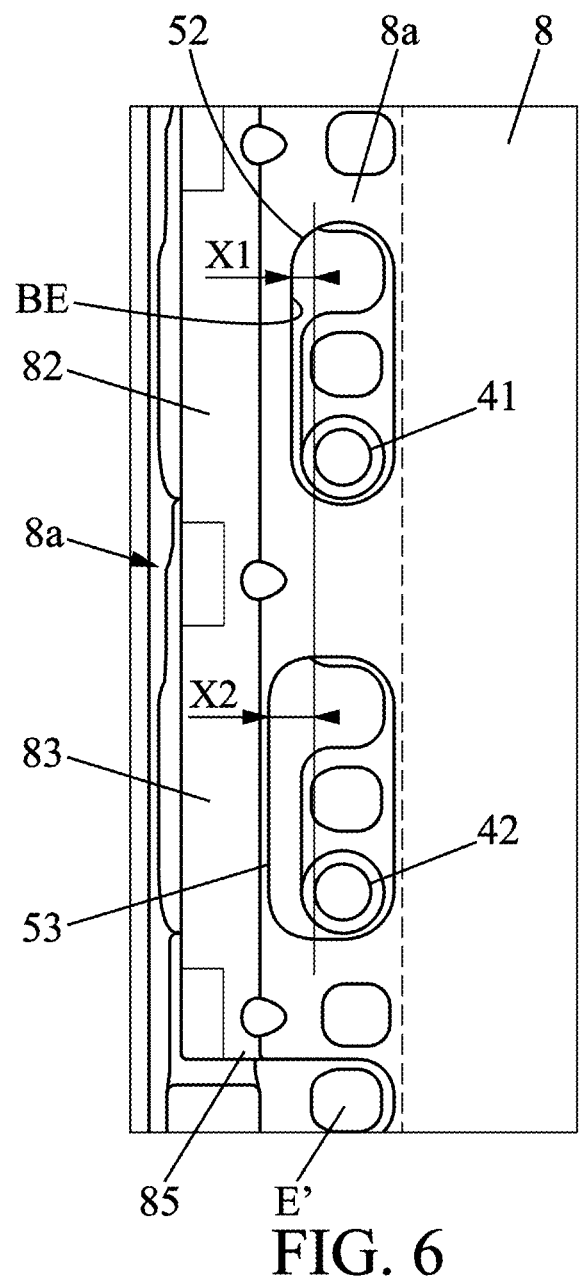
FIG. 6 is a view of a detail from FIG. 5.

No clearance or a low clearance, here reflected by distance X1 (representative of local shrink stroke) in FIG. 6, is delimited between the slot abutment outer edge BE and the protruding pin or similar positioning member 41 that engages the slot 52 of the intermediate part 82. Such arrangement may be provided for one, two, three or at least four of the positioning members PM, which thus form stoppers (early stoppers) since X1<X2. The pouch corners and protecting body corners thus can continue to move inwardly during filling operation, while the intermediate parts 82 are blocked by the stoppers 41, 41'. At the corners, shrink strokes (X2) are longer than in the middle and will allow storing at least the same liquid capacity than without the belly/bulge retention.

While this embodiment shows a stack arrangement with the flexible pouch 2 and the protecting body 12 placed between frames 3, 4 or similar shell parts that belong to the stack arrangement, other configurations may be used, possibly using lateral or bent positioning members PM (more rigid than the plates) engaged/fastened to respective sides of the protecting body 12.

It is understood that the two plates 12A, 12B can move during filling of the pouch 2 and the margin portions 8a, 8b can shrink inwardly in the protecting body plane. Some of the positioning members 41, 41' advantageously act as stoppers, in order to have lower clearance range (X1) for shrink strokes of the protecting body 12 in a middle portion TP2 thereof, as compared to a higher clearance range at respective longitudinal end parts 81, 83 of the two opposite margin portions 8a, 8b. A higher constraining effect can be obtained in a center of the pouch 2. This is of interest for managing freeze/thaw operations of biopharmaceutical materials contained in the pouch 2.

Dashed lines in FIG. 7B show the kind of belly usually obtained when similarly allowing a significant stroke in each region of the margin portions 8a, 8b. It is thus of interest to limit or prevent the displacement of the middle part of the protecting body, in order to limit accumulated mass (of important thickness) that could be difficult to be thawed.

The holding and retaining device of the storage unit 10 may have one or more positioning members 42, 42', separate from the stoppers 41, 41', which are cooperating with a trough-slot 51, 53, 54, in order to have a high clearance reflected by distance X2 in FIG. 6. In variants, only positioning members E' arranged outside the limits of the protecting body 12 may be provided, for a guiding effect when the plate material is displaced inwardly in the intermediate parts 81, 83.

Referring to FIG. 7A, the pouch 2 can have an expansion controlled by the storage unit 10. The pouch longitudinal sides LS1 and LS2 can deform due to this control. Indeed, abutment by the stoppers or similar positioning members 41, 41' will limit deformation in the pouch middle section MS extending transversally between the intermediate parts 82 in assembled state of the system 1. The longitudinal profile of the respective protecting body longitudinal sides 121, 122 is for instance slightly curved or convex as view from the outside, as apparent from the examples shown in FIG. 7A. The middle portion TP2 of the protecting body 12, which is here covering the middle section MS, is not shown in FIG. 7B but is illustrated in FIG. 5 (non-filled state). In filled state, a depression can be obtained respectively in the middle portion TP2 and in the middle section MS, such depression being apparent in FIGS. 8-9 for instance. The middle portion TP2 longitudinally extends between two complementary portions TP1 and TP3 covering each about a third of the covering portion 8.

The shrink at the respective four sides causes a reduction in size of the pouch perimeter or circumference in the XY plane (corresponding here to the protecting body plane P) for the pouch as filled with biopharmaceutical fluid, so that pouch initial width w is decreased to reach width w', with typically at least one of the following relations verified (preferably the two relations verified):

$$1.5 \leq X2 - X1 \leq 25 \text{ (in mm)}$$

$$2(X2-X1)/(w-w') \leq 1$$

Similarly, pouch initial length L is decreased to reach length L'.

As illustrated and a bit exaggerated in FIG. 7A, a median width of the pouch 2 measured in filled state in the middle section MS of the pouch 2 may be inferior or equal to pouch initial width w and strictly superior to width w'. It is understood that the expansion of the pouch 2 and protecting body 12, is less limited at the respective end parts 81, 83 than at the intermediate parts 82 and pouch thickness thus cannot increase as local width remains great, as great or almost as great as initial width w.

Referring to FIG. 7B, the dashes lines show a usual bulge or belly of high expansion when not using the differentiated positioning members—margin portions cooperation as above described. The two bulges B1 and B2 of lower expansion than such belly are typically obtained when having shrink stroke limited in the middle portion TP2, which is a portion substantially covering one central third of the flexible pouch 2 as considered along the longitudinal axis A or A'.

Figure 9:
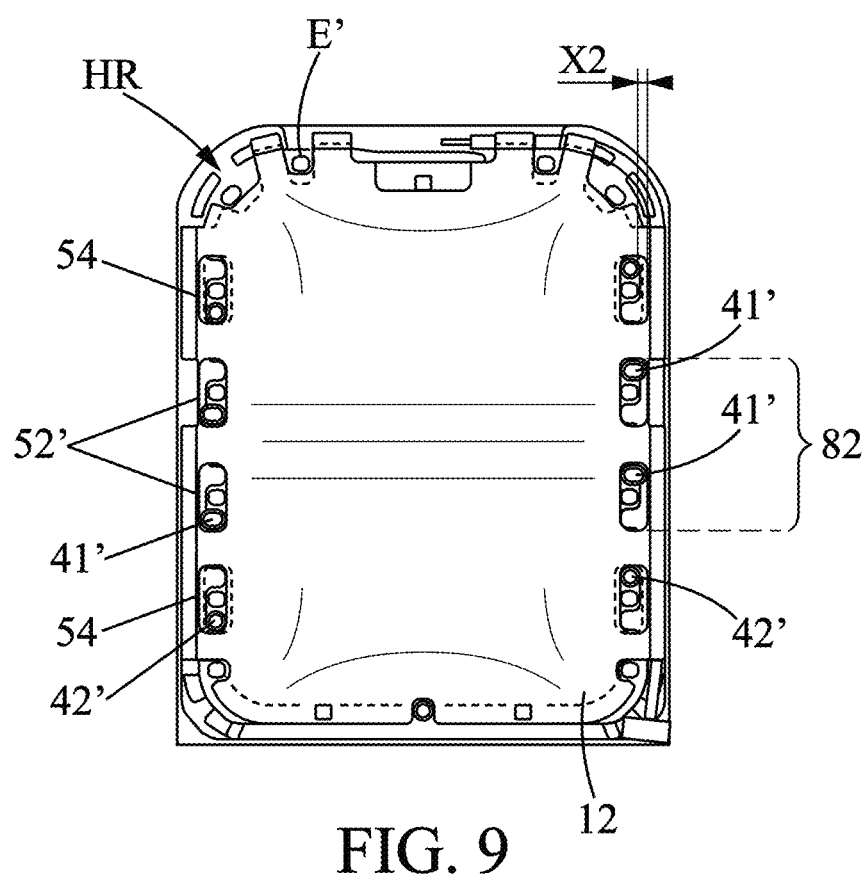
FIG. 9 is a top view similar to FIG. 5, showing a second embodiment with positioning members varying in size, in order to allow expansion of the protecting body only near the angles or corners of the system.

Now referring to FIGS. 5-6 and 9, the curved profile reflects a profile of shrink strokes allowed at different longitudinal positions of the two longitudinal sides 121, 122. Indeed, the margin portions 8a, 8b are able to be limited in at least two steps as the respective end parts 81, 83 are blocked in position after the one or more intermediate parts 82 are blocked.

While in FIGS. 5-6 (first embodiment), this is due to a different transverse size of the slots, with slots 52 narrower than slots 51, 53, the storage unit 10 illustrated in FIG. 9 uses a difference in transverse size of the positioning members, with the members 41' of greater transverse size to form early stoppers, as compared to narrow size of the other positioning members 42'.

In the embodiment of FIG. 9, it can be seen that the slots 52" and 54 may have identical width. Here, dashed lines reflect the displacement profile in peripheral part of the protecting body 12. The differences in displacement correspond to the shrink stroke profile as controlled by use of the positioning members 41' and 42'. Protecting body corners thus can move at least 4 or 5 mm more (inwardly) than the intermediate parts 82.

The storage unit comprises a protecting body, typically made of two plates, for sandwiching the flexible pouch intended to contain the fluid (biopharmaceutical fluid) and further comprises two parts, here two rigid pieces forming a shell or similar means for holding the assembly formed by the flexible pouch and the protecting body. The assembly illustrated in the middle of FIG. 2 is not filled with any fluid yet. The storage unit 1

More generally, the protecting body 12 mounted to sandwich the flexible pouch 2 may be received in a single cavity of any suitable holding and retaining device, which is rigid and delimits an outer circumference of the storage unit 1. Depending on level of filling of the pouch 2 sandwiched by the plates 12A, 12B, the protecting body 12 may comprise one or more areas of maximum thickness. In order to accommodate this thickness variation, the holding and retaining device may be of annular shape. The one or more bulges/bellies B1, B2 can formed due to the expansion control and early stopping effect at the intermediate parts 82, so that the middle section MS is much less movable as compared to complementary sections of the protecting body 12.

The system 1 is well adapted for freezing, storing and thawing biopharmaceutical materials contained in a flexible pouch 2 of simple conception. A storage unit 10 as above described is of interest for filing the pouch 2 with a controlled and restricted expansion, so that expansion is restricted in one or more areas where the fluid thickness would reach a maximum if no expansion control is carried. The interior volume or cavity delimited by the main walls W1, W2 is expanded with prevention of free expansion in the middle areas of these walls W1, W2. Especially expansion can be limited along one or more belt line BL that joins the two intermediate parts 82, as illustrated in FIG. 7A.

Depression along such belt line BL, due to the low or inexistent shrink stroke in the intermediate parts 82, typically creates at least one recess. In the pouch 2 as filled and in containment configuration of the storage unit 10, at least one recess is thus created in the filled pouch 2 between the two bulges B1, B2 that are formed respectively in front of and at rear of the belt line BL (line crossing the at least one recess). Of course, such effect does not prevent fluid communication between the two opposite regions where a bulge B1 or B2 is formed. This allows a generally equal distribution of fluid. As more than one region is created with bulge formation, a more uniform thickness distribution is obtained, without decreasing the capacity of the pouch 2. In other words, the decreased thickness of each region decreases the thickness at any one point in the pouch 2, and thus no "belly" is formed.

The pouch 2 and the storage unit 10 may be exposed to a temperature of about −70° C. or lower to freeze the biopharmaceutical fluid. The annular shape of the shell HR is of interest to provide a recessed area where cold air can circulate and flow between systems 1 (even if they are staked). But other shapes and structures may be used to form a holding and retaining device for a controlled expansion, in order to eliminate or reduce the formation of too significant projections during freezing. In some options with a shell covering/contacting the covering portion 8, this also facilitates separation of the halves or protecting parts 3, 4 of the shell HR.

The present invention has been described in connection with the preferred embodiments. These embodiments, however, are merely for example and the invention is not restricted thereto.

Of course, the pouches 2 of the present invention are not in any way limited to pouches having four sides and/or pouches that are larger than wide. The pouches 2 may have other shapes provided with two generally parallel sides, covered by the pair of plates 12A, 12B or similar protecting body including two flat portions. While each plate 12A or 12B is illustrated as a one-piece element, options are available for combining two or more flat containment pieces able to restrict expansion of the pouch, while being more or less displaceable for adjustment of the shrink stroke.

In preferred embodiments as illustrated, the positioning members PM are integral parts of the shell HR formed by the two protecting parts or frames 3, 4 (here two protecting pieces of annular shape). Of course, the positioning members PM may be also members separate from the shell HR; for instance, sliding members inserted in slots of the shell HR and in the protecting body through-slots 51, 52, 53, can also form the positioning members. In variants, the protecting body through-slots 51, 52, 53 may be replaced by at least one cavity or hollow included in the respective plates, for receiving a positioning member PM that prevent inward movement, locally in a margin portion 8a or 8b.

More generally, the variation of the clearance for the shrink stroke may be also obtained by abutting members without any shell of with abutting members made separate from the shell HR, mounted or not on the shell.

In some options, the cuts, slots or cavities of the protecting body 12 may be of same lateral size in an initial state, but with some of them able to be deformed or folded due to action of the positioning members. As a result, it is permitted to have an increased clearance for the cuts, slots or cavities that are deformed, folded or the like. These modified cuts, slots or cavities extend near the corners of the protecting body 12, so that less clearance is allowed in the intermediate parts.

It will be understood by those skilled in the art that other variations and modifications can easily be made within the scope of the invention as defined by the appended claims, thus it is only intended that the present invention be limited by the following claims.

Any reference sign in the following claims should not be construed as limiting the claim. It will be obvious that the use of the verb "to comprise" and its conjugations does not exclude the presence of any other elements besides those defined in any claim. The word "a" or "an" preceding an element does not exclude the presence of a plurality of such elements.

The invention claimed is:

1. A storage unit for use in freezing, storing and thawing biopharmaceutical materials contained in a flexible pouch, the storage unit comprising:
  a protecting body for protecting the flexible pouch, which comprises two plates, the protecting body further comprising a longitudinal axis and two margin portions at two longitudinal sides of the protecting body;
  a holding and retaining device, the holding and retaining device including positioning members that are engaged in the two opposite margin portions;
  wherein the two plates comprise each:
  a covering portion for covering the flexible pouch, the covering portion separating the two opposite margin portions;
  wherein the two plates are able to sandwich the flexible pouch for constraining the flexible pouch, the protecting body extending planar in an empty state of the flexible pouch, along a protecting body plane;

wherein the protecting body is displaceable in an interspace delimited by two separate protecting parts of the holding and retaining device, to allow the two plates moving, extending, and shrinking in a transverse direction belonging to the protecting body plane, and wherein all or part of the positioning members is forming stoppers for locally stopping inward movement of the two margins portions, which is due to filling of the flexible pouch sandwiched between the two plates of the protecting body, in order to have lower clearance range for shrink strokes of the protecting body in a middle part thereof, as compared to a higher clearance range at respective longitudinal end parts of the two opposite margin portions.

2. The storage unit of claim 1, wherein the positioning members are distributed longitudinally and are each configured to limit shrink stroke of the longitudinal sides of the protecting body by a stopping effect due to engagement of the positioning members with the two opposite margin portions:

at one or more intermediate parts, and optionally at respective longitudinal end parts of the two opposite margin portions, and wherein said lower clearance range is provided for the engagement of the positioning members at the one or more intermediate parts, so that a shrink stroke of the two longitudinal sides of the protecting body, due to filling of the flexible pouch sandwiched between the two plates of the protecting body, is less limited at the respective end parts than at the one or more intermediate parts.

3. The storage unit of claim 1, wherein the two opposite margin portions are part of a fastening assembly to prevent any shifting in position between the two plates once they are mutually fastened at least in the two margin portions, in a predetermined superimposed configuration for forming the protecting body.

4. The storage unit of claim 1, wherein several protecting body through-slots are provided and longitudinally distributed in each of the two opposite margin portions, and wherein the two protecting parts consist in two pieces, which are a first frame that extends below the protecting body and a second frame that extends above the protecting body, one amongst the first frame and the second frame comprising a plurality of inserting pins than are inserted via the protecting body through-slots to come in direct contact with receiving adjustment members of the other one amongst the first frame and the second frame.

5. The storage unit of claim 1, wherein the two protecting parts consist in two pieces, which are a first frame that extends below the protecting body and a second frame that extends above the protecting body, and wherein the two pieces are complementary halves of an annular plastic shell that is rigid or semi rigid and bears or integrally includes the positioning members.

6. The storage unit of claim 4, wherein the two pieces are chosen amongst:

two pieces that are each configured to entirely cover a corresponding covering portion of the protecting body and to sandwich the two margin portions, or two pieces of same annular shape configured to sandwich the two margin portions.

7. The storage unit of claim 2, wherein the respective end parts include four end parts crossed by four positioning members of the positioning members, and wherein the one or more intermediate parts comprise two intermediate parts constrained by a pair of positioning members of the positioning members, each of the two intermediate parts being intersected by one positioning member of said pair, which is separate from the four positioning members, the two intermediate parts being distributed in the two opposite margin portions.

8. The storage unit of claim 2 wherein the positioning members are distributed around the covering portion, and wherein each of the positioning members is configured as a stationary member extending through a protecting body through-slot, the shrink stroke of the two longitudinal sides of the protecting body being able to be limited in two steps as the respective end parts are blocked in position after the one or more intermediate parts are blocked, due to a difference in transverse size of the protecting body through-slots.

9. The storage unit of claim 2, wherein the positioning members are distributed around the covering portion, and wherein each of the positioning members is configured as a stationary member extending through a protecting body through-slot, the shrink stroke of the two longitudinal sides of the protecting body being able to be limited in two steps as the respective end parts are blocked in position after the one or more intermediate parts are blocked, due to a difference in transverse size of the positioning members.

10. The storage unit of claim 7, wherein several protecting body through-slots are provided and longitudinally distributed in each of the two opposite margin portions, and wherein the pair of positioning members are engaged in two corresponding through-slots of the protecting body, in order to limit shrink stroke of the two longitudinal sides of the protecting body, so that in a filled-state of the flexible pouch sandwiched between the two plates of the protecting body, the covering portion forms two bulges separated by a constriction line extending from one of the two intermediate parts to the other one of the two intermediate parts.

11. The storage unit of claim 7, wherein several protecting body through-slots are provided and longitudinally distributed in each of the two opposite margin portions, and wherein when filling the flexible pouch, the pair of additional positioning members are in abutment engagement in two corresponding ones of the protecting body through-slots before any abutment engagement of the four positioning members that are distributed in four corresponding ones of the protecting body through-slots.

12. The storage unit of claim 7, wherein the four end parts have each a position inwardly shifted within one given margin portion of the two margin portions as compared to a middle area of same given margin portion, one of the two intermediate parts being included in the middle area.

13. The storage unit of claim 1, wherein the protecting body is made of a freeze resistant polyester or copolyester material that is not brittle at about 25° F. or −4° C., the material being preferably PET or TRITAN.

14. A freeze/thaw containment system for containing a biopharmaceutical composition, comprising:

the storage unit according to claim 1, a flexible pouch sandwiched between the two plates, the flexible pouch preferably containing a biopharmaceutical composition, the flexible pouch being more flexible than material of the protecting body.

15. The freeze/thaw containment system according to claim 14, wherein the two plates constrain the flexible pouch by the covering portion that extends between the two margin portions.

16. The freeze/thaw containment system according to claim 14, wherein the two plates comprise, on a peripheral side that is at least partly included in one of the two margin portions, an assembly for holding a hose connected to the flexible pouch, wherein the system comprises at least one hose comprising at least a portion hold by the assembly for holding a hose, and wherein one or more protecting body through-slots involved for having the lower clearance range are arranged between the flexible pouch and the assembly for holding a hose.

17. A method of assembling a freeze/thaw containment system as recited in claim 14, which is a protection system for storing and withstanding freezing and thawing of the biopharmaceutical composition contained in the flexible pouch of the freeze/thaw containment system, the method comprising:

sandwiching a flexible pouch between two plates of a protecting body, selectively by a covering portion distributed in the two plates for covering the flexible pouch, the protecting body being configured for protecting the flexible pouch and comprising the two plates, the protecting body further comprising a longitudinal axis and two margin portions at two longitudinal sides of the protecting body, the covering portion separating the two opposite margin portions, the protecting body extending planar at least in an empty state of the flexible pouch, along a protecting body plane, forming a storage unit for use in freezing, storing and thawing biopharmaceutical materials contained in the flexible pouch, by arranging the protecting body between two separate protecting parts of a holding and retaining device, the holding and retaining device including positioning members that are engaged in the two opposite margin portions, the two separate protecting parts of the holding and retaining device being interlocked, preferably by the positioning members, in order to have the protecting body sandwiched between the two protecting parts and arranged in an interspace delimited by the two protecting parts, in a filled state of the flexible pouch, constraining the flexible pouch by the two plates and allowing the protecting body to be displaced in the interspace by movement of the two plates that extend and shrink in a transverse direction belonging to the protecting body plane, the positioning members being distributed longitudinally and limiting shrink stroke of the longitudinal sides of the protecting body by a retaining effect due to engagement of the positioning members with the two opposite margin portions:

at one or more intermediate parts, and at respective longitudinal end parts of the two opposite margin portions, wherein a lower clearance range is provided for the engagement of the positioning members at the one or more intermediate parts, so that shrink stroke of the two longitudinal sides of the protecting body, due to filling of the flexible pouch sandwiched between the two plates of the protecting body, is less limited at the respective end parts than at the one or more intermediate parts.

18. The method according to claim 17, wherein the flexible pouch is inflated when filling the flexible pouch with the biopharmaceutical composition in a fluid state, and each covering portion is constraining a middle of the flexible pouch more than two opposite ends of the flexible pouch, due to a first relative displacement between first positioning members and first protecting body through-slots that interact with the first positioning members, the first protecting body through-slots being provided in an intermediate position in each of the margin portions, wherein the first relative displacement is less than a second relative displacement between second positioning members and second protecting body through-slots that interact with the second positioning members, each of the second protecting body through-slots being provided in one of the longitudinal end parts of the margin portions.

19. The method according to claim 17, wherein the positioning members are provided with:

a first interlocking assembly having interlocking members that are configured for attaching two intermediate parts of the two margin portions to the holding and retaining device, in a side position within a first clearance range, the first clearance range being measured in a direction perpendicular to the longitudinal axis and parallel to the protection body plane;

a second interlocking assembly having interlocking members that are part of the positioning members and configured for attaching four respective end parts, which are distributed in the two margin portions, to the holding and retaining device, in an adjustable position that is adjustable within a second clearance range, the second clearance range being measured in a direction perpendicular to the longitudinal axis and parallel to the protection body plane;

and wherein the first clearance range is lower than the second clearance range, so that in the filled-state of the flexible pouch sandwiched between the two plates of the protecting body, the respective end parts are able to move inwardly more than the two intermediate parts.

\* \* \* \* \*